United States Patent [19]
Weber-Liel

[11] 3,879,764
[45] Apr. 29, 1975

[54] WORK-GLOVE

[76] Inventor: Ralf Weber-Liel, Talweg 8, 2105 Seevetal 1, Germany

[22] Filed: Mar. 12, 1974

[21] Appl. No.: 450,425

[30] Foreign Application Priority Data
  Mar. 12, 1973  Germany............................ 7309344
  Mar. 19, 1973  Germany............................ 7310311

[52] U.S. Cl. ..................................................... 2/167
[51] Int. Cl............................................ A41d 19/00
[58] Field of Search ........... 161/190, 159, 160, 109; 2/159, 161 A, 161 R, 158, 167, 168

[56] References Cited
UNITED STATES PATENTS

| | | |
|---|---|---|
| 2,841,205 | 7/1958 | Bird ................................... 2/167 Y |
| 3,173,150 | 3/1965 | Mohler ................................... 2/167 |
| 3,256,882 | 6/1966 | Huber ................................... 2/161 R |
| 3,382,138 | 5/1968 | Barth ................................... 2/168 X |
| 3,530,031 | 9/1970 | Loew ................................... 161/106 |
| 3,769,376 | 10/1973 | Arband ........................... 161/190 X |

FOREIGN PATENTS OR APPLICATIONS 7,002,051  8/1971  Netherlands........................... 2/167

Primary Examiner—Geo. V. Larkin
Attorney, Agent, or Firm—Thomas E. Beall, Jr.

[57] ABSTRACT

The invention relates to a work-glove, at least the working surface of which is formed by a laminate of polyurethane sheeting, preferably formed with microscopically small pores and at least 0.1 mm thick bonded to a backing carrier material.

6 Claims, 2 Drawing Figures

WORK-GLOVE

The invention refers to a work-glove which is produced by employing a plastics-coated carrier material.

Work gloves of the kind in which the plastics coating is produced by immersing or impregnating cloth or leather are only one among many attempts to achieve an effective protective clothing. Thus work-gloves are also known which consist of leather, of textile material and of rubber provided if necessary with a cloth carrier. All of these work gloves are unable to cope with extreme stresses. They offer in many cases only insufficient protection and are subject to excessive wear. Often they must be changed after a matter of hours.

The object of the invention is to produce an effective work-glove which besides the necessary flexibility has an enhanced degree of resistance to cutting and wearing away.

In accordance with the invention a work-glove is made from polyurethane sheeting bonded to a backing carrier material.

It has been found that this new work-glove, employing the laminate at least at its working surface, can withstand extreme stresses during a quite considerable working life. The polyurethane sheeting (in sheet or strip form) is wear-resistant and has a very high resistance to nicking. Even when handling extremely sharp-edged material the work-glove offers for a long time effective protection.

In addition to this the polyurethane sheeting is oil- and petrol-proof. The field of application of the work-glove is thus subject to no restrictions on this account.

The polyurethane sheet preferably has a minimum thickness of 0.1 mm, and is preferably substantially 0.2 mm thick. At this thickness the work-glove exhibits a high degree of flexibility, that is, in combination with an adequate resistance to cutting and wearing away under extreme stresses.

In accordance with a further feature of the invention, the polyurethane sheeting is formed with microscopically small pores. These provide good breathing without the cutting- and wear-resistance being impaired, a further advantage over known work-gloves which do not take the breathing problem into account to an adequate degree.

The new work-glove can be modified for different purposes. Thus an enhanced breathing activity can be achieved by perforations being provided, or especially provided, on the backs of the hands by means of cut-outs. It is also possible to employ a back of fabric or inserts of fabric. For improvement of the fit rubber bands, buckles or the like can be used. One is free, too, in the choice of the carrier material. Thus, for example, in particular absorbent carrier cloths may be used if there is a need to absorb large quantities of sweat.

A work-glove constructed in accordance with the invention is illustrated in the accompanying drawing, in which.

Figure 1:
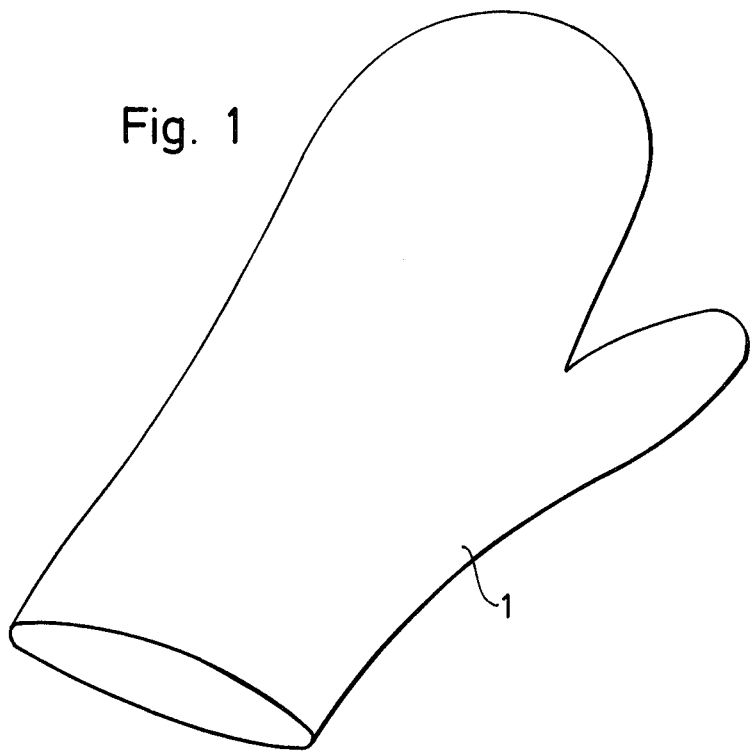
FIG. 1 is a perspective view.
Figure 2:
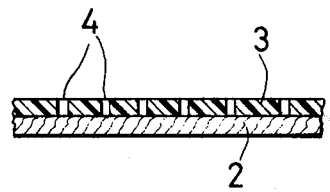
FIG. 2 is a section through a piece of the composite material from which the glove is made.

The work-glove 1 which is shown in FIG. 1 consists of a material such as is illustrated in section in FIG. 2. In consists of a carrier material 2, in the present case a particularly absorbent textile fabric, and a polyurethane sheet 3 which is bonded to the carrier material 2. The polyurethane sheet forms the outside of the work-glove. Its thickness in the illustrated example is 0.2 mm. The sheet exhibits microscopically small pores 4 which for clearer display are shown enlarged.

In the case of the example illustrated the work-glove consists entirely of the carrier material bonded with the polyurethane sheeting. However, cut-outs or inserted pieces of fabric may be provided. What is essential is that the parts of the work-glove employed as the work-surface carry a polyurethane sheeting lying on the carrier material. The work-glove can also be formed as a glove with fingers.

I claim:

1. A work glove having a laminate at least forming the outer working surfaces, said laminate comprising: at least one backing carrier sheet material and a polyurethane sheeting bonded to the exterior of said backing carrier sheet material; and said polyurethane sheeting forming the outer exposed working surfaces of the work glove.

2. A work glove according to claim 1, wherein said polyurethane sheeting has a thickness of at least 0.1 mm.

3. A work glove according to claim 2, wherein said polyurethane sheeting is provided with microscopically small through pores forming means providing passage of fluid through said laminate for breathing.

4. A work glove according to claim 1, wherein said polyurethane sheeting has a thickness of substantially 0.2mm.

5. A work glove according to claim 4, wherein said polyurethane sheeting is provided with microscopically small through pores forming means providing passage of fluid through said laminate for breathing.

6. A work glove according to claim 1, wherein said polyurethane sheeting is provided with microscopically small through pores forming means providing passage of fluid through said laminate for breathing.

* * * * *